United States Patent Office 3,332,571
Patented July 25, 1967

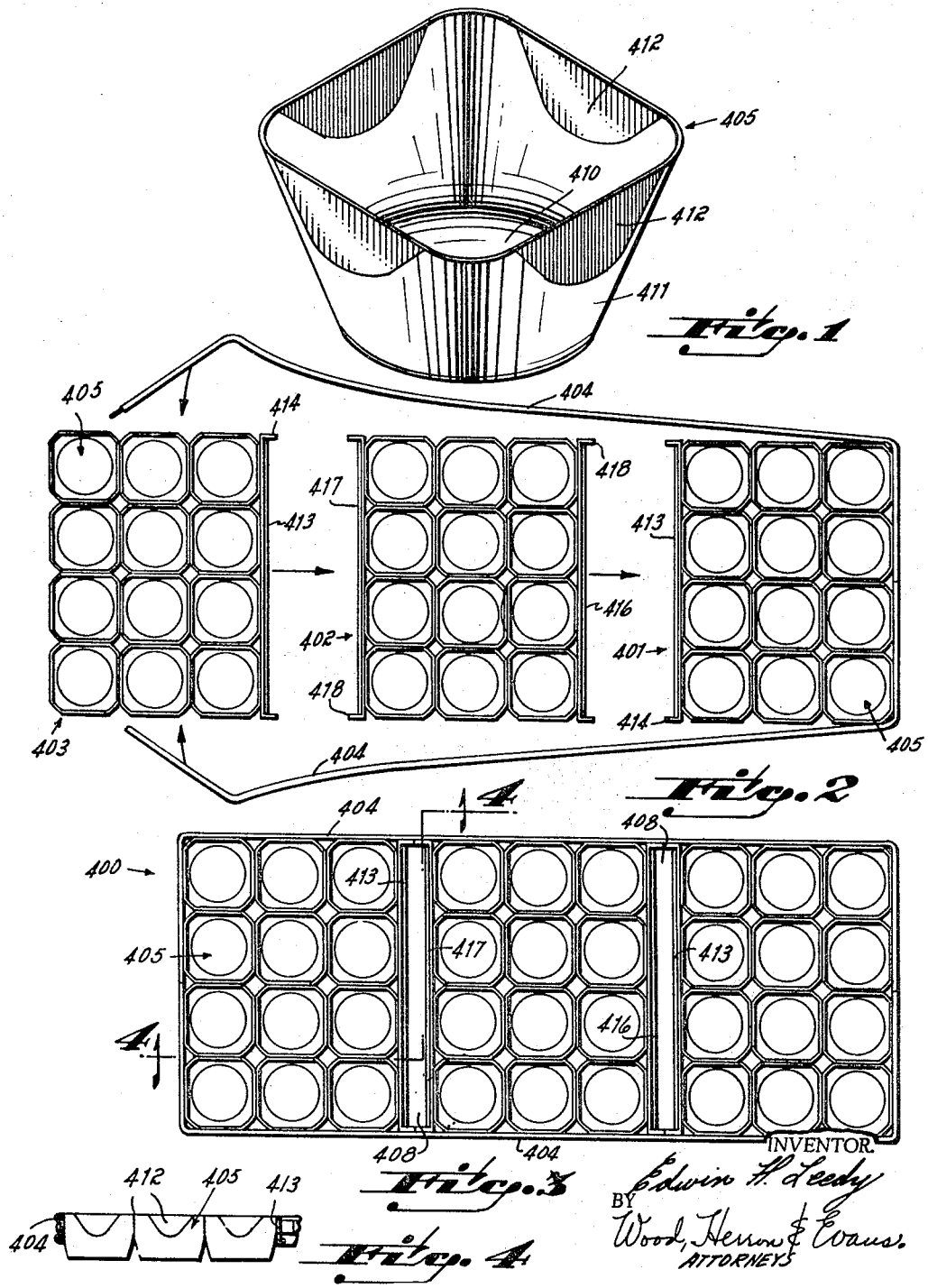

3,332,571
BAKERY PAN
Edwin H. Leedy, Chicago, Ill., assignor, by mesne assignments, to Lockwood Manufacturing Company, a corporation of Delaware
Original application Dec. 9, 1963, Ser. No. 328,967. Divided and this application June 24, 1966, Ser. No. 560,198
2 Claims. (Cl. 220—23.2)

This application is a division of application Ser. No. 328,967, filed Dec. 9, 1963.

This invention relates to bakery pans and more particularly, to pans for baking a multiplicity of baked rolls or cakes. The pan of this invention may be used to bake numerous types of baked rolls and cakes, including but not limited to:

(a) "Brown-n-Serve" Rolls: Yeast dough rolls which are fully developed and baked but withdrawn from baking temperature before caramelization of the crust occurs. In this state they are essentially colorless with the intention that baking to create the typical brown color of finished baked products shall be completed by the ultimate consumer.

(b) "Finished Baked Rolls": Yeast dough rolls completely developed and baked to a caramelized crust condition to make them acceptable for consumption "as is."

(c) "Finished Baked Sweet Rolls": Yeast or chemically leavened dough products of the nature of corn muffins, fruit muffins, Danish pastries, nut rolls, etc., fully baked for consumption "as is."

(d) "Finished Baked Cakes": Chemically leavened sweet dough products of the nature of Cup Cakes, Mary Ann Shells, Tortes, etc., fully baked for consumption "as is."

It has been a primary objective of this invention to provide an improved bakery pan which increases baking efficiency by reducing the cost of baking bakery products. The pan of this invention accomplishes this objective by increasing the capacity of an oven so that a greater volume of products may be baked simultaneously. Increasing the capacity of the ovens of a bakery also increases the capacity of the bakery so that a given bakery may bake more products in a given number of ovens than has heretofore been possible.

Typically, the cakes or rolls are baked in a pan which comprises a plurality of metal cups fitted into apertures of a flat sheet of metal and secured therein by crimping the cups and sheet together. The disadvantage of this type of pan is that it wastes a great deal of space between adjacent cups and thus wastes oven space or capacity.

Another type of pan which minimizes wasted oven space is a so-called "hamburger bun" type of pan in which a plurality of hamburger buns are baked simultaneously. This is a shallow pan in which the cups are drawn from or stamped into a flat sheet of heavy gauge metal. The disadvantage of the construction is that it is limited to shallow-type products.

The invention of this application overcomes the objectionable characteristics of both the crimped type pan as well as the shallow stamped pan. Specifically, it enables deep products to be baked in very closely spaced cups so that maximum oven space is utilized.

Briefly, the invention of this application comprises a plurality or cluster of deep drawn metal cups welded together along their vertical walls so that the cups are spaced apart only two thicknesses of the metal from which the cups are drawn. The cluster is then wrapped with a reinforcing strap which is then welded to the periphery of the cluster to make a unitary pan.

Another aspect of the invention of this application is that it enables collation of the rolls or cakes to be eliminated between the oven and the container into which the baked products are subsequently packed for shipment. Since the rolls are baked in pans on the same centers or in the same physical orientation in which they are to be packed, they need not be collated or rearranged before packing, so that the packing operation may be easily handled by automatic handling equipment, as for example by the machine disclosed in my application Ser. No. 328,-967, of which this application is a division.

These and other objects and advantages of this invention will be more readily apparent from a description of the drawings in which:

FIGURE 1 is a perspective view of one cup of the baking pan used in the machine of this invention, FIGURE 2 is an exploded top plan view of the baking pan used in the machine of this invention, FIGURE 3 is a top plan view of a baking pan having three clusters of baking pan cups, FIGURE 4 is a cross sectional view taken along line 4—4 of FIGURE 3.

Baking pan

Referring to FIGURES 1 through 4, there is shown the novel baking pan 400 of this invention, which comprises three sections or clusters 401, 402, and 403 secured together by a wrapping strip 404. Each section includes twelve baking cups 405 welded together in side-by-side relationship so as to define a generally rectangular cluster of baking cups. The clusters are then assembled in spaced relationship with a spacial gap 408 between them.

Referring particularly to FIGURE 1, it will be seen that each baking pan cup 405 has a circular bottom surface 410 and a side wall 411 which in cross section is circular at its bottom and generally square at its top. The side wall tapers outwardly from the bottom surface 410 in order to facilitate removal of rolls from the cup. In practice the cup is manufactured from a flat sheet of material. It is first passed through a drawing die in which a circular cross section cup having a wide flange is produced. Thereafter it undergoes a second drawing step in which it is drawn to full depth and the flats 412 are placed on the sides. It is then placed in a trimming die in which any top flange material is cut off.

The individual cups are welded together in a 3 x 4 cup matrix, the flats 410 on the sides serving as welding surfaces by means of which the individual cups can be spot welded together. Thereafter a spacer strip 413 is spot welded to the flats on the inside edges of the two end clusters 401 and 403 of the pan. Each of these spacer strips 413 has inwardly turned flanges 414 on its ends. A pair of spacer strips 416, 417 are welded to both inside sides of the middle section 402. These strips 416, 417 are identical to the spacer strips 414 and also have flanges 418 adapted to abut against the flanges 414 of the strips 413. The individual sections 401, 402 and 403 are assembled with the flanges 414 and 418 in abutting relationship. Thereafter the wrapping strip 404 is assembled around the three section pan assemblies and welded to the exposed flats 412 around the periphery of the individual clusters such that the wrapping strip 404 completely surrounds the entire assembly.

The completely assembled pan consists of three spaced sections each containing twelve cups. Of course, the pan could be made from fewer or a greater number of individual clusters each containing fewer or a greater number of individual cups. Cups of varying sizes, depths and shapes may be made generally following the procedure described above and assembled into clusters and pan sets in a similar manner. The function of the spacing between the individual clusters is to permit the pan to be indexed so as to locate twelve cups 405 beneath a transport head so that one cluster of the pan can be unloaded, the pan indexed to locate the following cluster beneath the transport head, and that cluster unloaded, etc.

While only a single modification of the inventive baking pan of this application has been illustrated and described herein, those skilled in the baking art will readily appreciate numerous changes and modifications which may be made in this pan without departing from the spirit of my invention. Therefore, I do not intend to be limited except by the scope of the appended claims.

Having described my invention, I claim:

1. A baking pan which in top plan view is rectangular in configuration comprising,
   a plurality of matrixes of baking cups,
   a plurality of individual baking cups assembled in each matrix, each matrix being spatially separated from the adjacent matrix, each of said matrixes being rectangular in top plan configuration,
   each of said cups having a circular bottom surface and a side wall extending upwardly and outwardly from said bottom surface, said side wall having a top edge which defines and bounds an opening of larger area than said bottom surface, said side wall having four vertical flat surfaces formed therein adjacent to the top of said side wall, said flat surfaces being so located that said opening of said cup is generally square,
   said flat side wall surfaces of adjacent cups in each matrix being interconnected by weldments adjacent the top so that those portions of the side walls of adjacent cups contiguous to said flat vertical surfaces of said cups form an acute angle therebetween, the top portions of interior surfaces of adjacent cups being separated only by the double thickness of said cup side walls, the orientation of said cups within each of said matrixes being maintained by said weldments independently of any supporting framework located between said cups, and
   all of said matrixes being enclosed by a rectangular mounting strip which surrounds the periphery of said matrixes and holds said matrixes in assembled relationship.

2. A baking pan comprising,
   a plurality of individual baking cups assembled in a rectangular matrix,
   each of said cups having a bottom horizontal surface and a side wall extending upwardly from said bottom surface, said side wall having a top edge which defines and bounds an opening, said side wall between said bottom surface and said top edge residing completely in either a vertical plane or a plane which defines an acute angle with a vertical plane so that the bottom wall is the only portion of each cup which is located in a horizontal plane, at least a portion of said side wall having a flat vertical surface formed therein,
   said flat vertical side wall surfaces of adjacent cups in said matrix being interconnected by weldments to form a welded assembly of a plurality of cups with portions of interior surfaces of adjacent cups separated only by the double thickness of said cup side walls, the orientation of said cups within said assembly being maintained by said weldments independently of any supporting framework located between said cups, and
   said matrix being enclosed by a rectangular mounting strip which surrounds said rectangular matrix and is welded to the periphery of said matrix so as to reinforce said assembled matrix.

References Cited

UNITED STATES PATENTS

| | | | |
|---|---|---|---|
| 2,005,449 | 6/1935 | Arrowsmith | 220—32.2 |
| 2,006,938 | 7/1935 | Birkenhauer | 220—23.2 |
| 2,729,358 | 1/1956 | Phillips | 220—23.2 |

THERON E. CONDON, *Primary Examiner.*

JAMES M. MARBERT, *Examiner.*